United States Patent [19]
Pugsley

[11] 3,965,289
[45] June 22, 1976

[54] IMAGE REPRODUCING METHOD

[75] Inventor: Peter C. Pugsley, Pinner, England

[73] Assignee: Crosfield Electronics Limited, London, England

[22] Filed: June 30, 1975

[21] Appl. No.: 591,959

[30] Foreign Application Priority Data
July 1, 1974   United Kingdom............. 29113/74

[52] U.S. Cl...................................... 178/6; 358/80
[51] Int. Cl.²........................................ H04N 1/38
[58] Field of Search ............ 178/6, DIG. 6; 358/75, 358/78, 80

[56] References Cited
UNITED STATES PATENTS

| | | | |
|---|---|---|---|
| 3,612,753 | 10/1971 | Korman | 358/80 |
| 3,745,243 | 7/1973 | Seitz | 358/78 |
| 3,893,166 | 7/1975 | Pugsley | 358/80 |
| 3,894,178 | 7/1975 | Pugsley | 178/6 |

*Primary Examiner*—George H. Libman
*Assistant Examiner*—Michael A. Masinick
*Attorney, Agent, or Firm*—Kemon, Palmer & Estabrook

[57]           ABSTRACT

To provide an electronically reproduced image of an original in which defects have been removed by retouching, defects in the original are marked in such a manner that the signals from an analysing scanner corresponding to the defect marking are distinguishable from those corresponding to the remainder of the original and the sensing of the defect-representing signals is used to cause a replacement signal, derived as a function of the densities of picture elements adjacent the defect in the original, to be substituted for the defect-representing signal before the train of signals from the analysing scanner is used to control the treatment of an output surface to form the image.

7 Claims, 3 Drawing Figures

IMAGE REPRODUCING METHOD

Separations made on an electronic scanner frequently require some "editorial retouching" and/or "defect retouching" by hand. By "editorial retouching", we mean the alteration in density (or dot size) of certain areas of a separation to effect a change in the appearance of a subject, for example a colour modification. By "defect retouching", we mean the retouching required when scratches, specks and other defects on the original have caused localised defects on the separations.

The present invention is concerned with a method of image reproduction of the kind in which an original to be reproduced is scanned, element by element, by an analysing scanner to provide a train of electric signals representative of density values of successively scanned picture elements and in which the said train of signals is used to control the treatment of successively scanned elements of an output surface, whereby the output surface bears a reproduction of the said original.

According to the present invention, to form a retouched reproduction of the original, the method further comprises: scanned elements of an output surface, whereby the output surface bears a reproduction of the said original. According to the present invention, to form a retouched reproduction of the original, the method further comprises: marking a defect on the original prior to scanning with the analysing scanner, the marking applied to the defect and the analysing scanner being such that signals from the scanner indicative of the defect marking are distinguishable from signals from the remainder of the original; sensing the presence of a defect-indicating signal in the scanner output; deriving from a correction generator, which receives the electric signals derived from the analysing scanner, a replacement signal for the defect-indicating signal, the replacement signal being derived as a function of the densities of picture elements in a strip or area within which the said defective picture element is located; and under the control of the defect-indicating signal, substituting the said replacement signal for the electric signal corresponding to the defective picture element in the train of signals for controlling the output surface treatment.

In this way, the original serves as its own "retouching mask".

The signals derived from the analysing head may be used directly, i.e., without intermediate storage, for the preparation of a reproduction, or the signals may be stored and used subsequently for the preparation of the reproduction. In one form, the replacement signal for a defective picture element is derived from picture elements which are just ahead of and picture elements which are just behind the defective picture element in the line. In another form, the density values of the non-defective picture elements all around the defect are taken into account in computing the value of the replacement signal.

The marking of the defective areas must be with a paint which will result in a distinctive signal in the output of the analysing scanner. In this specification, the term "paint" is intended to include inks and other materials which can be applied as a coating layer to the defective areas of the original to mark these areas. The type of paint selected will depend on whether the original is scanned by reflection or is a transparency scanned by transmission of light. For the retouching of reflection copy, fluorescent paint can be used. If a single scanning head is used to provide both the image-representing signals and the defect-indicating signals, the light source of the scanning head must contain sufficient energy at a suitable wavelength to excite the fluorescence, so that the light level seen by the scanning head is higher than can be produced by the whitest non-fluorescent copy. Alternatively, separate scanning heads can be used, a main scanning head for providing the normal image-representing signals and a separate head, placed in advance of the main head, with a source of ultra-violet illumination. In this case, as there is no visible illumination in the separate scanning head, fluorescent materials alone are detected and there is no need to discriminate a "whiter-than-white" level. In the latter case, preferably a transparent paint that is substantially invisible to the eye is chosen.

In the case of transparencies, a paint which is more opaque than the densest part of the transparency can be used to mark the defects, giving a "blacker-than black" signal. Alternatively, an infra-red absorbing paint can be used, conventional transparency materials being transparent to infra-red radiation. An infra-red sensing head is required; this may be an extension of the main scanning head or an additional head in advance of the main scanning head. The infrared absorbing paint is preferably transparent and substantially invisible to the eye. In yet a further possibility, a fluorescent paint is used to mark defects on transparencies.

The preferred method for both reflection copy and transparencies is the use of a transparent paint, using a separate "defect" sensing head in advance of the main head. The "defect" signal is delayed in a shift register so that its release from the shift register coincides in time with the production of the signal from the main scanning head.

In order that the invention may be better understood, some examples of apparatus for carrying into effect the method according to the invention will now be described with reference to the accompanying drawings, in which.

Figure 1:
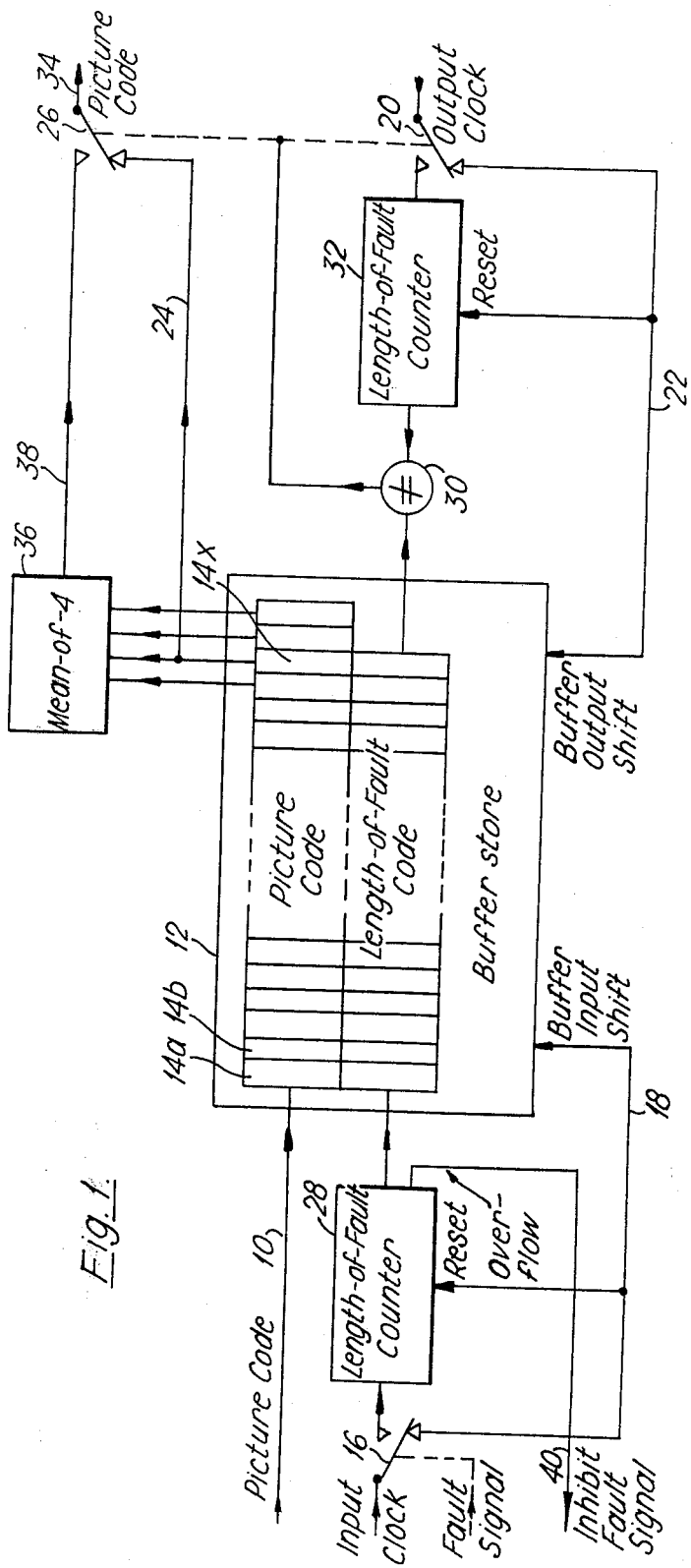
FIG. 1 shows in the form of a block diagram apparatus for calculating the replacement signals for defective picture elements.

The apparatus shown in FIG. 1 receives picture code signals, fault signals and clock signals and provides output picture code signals which include the replacement signals for the defective picture elements indicated by the fault signals.

In FIG. 1, the detection of a fault-indicating signal is made to operate a change-over switch 16 and thereby to disconnect input clock pulses from the shift input line 18 of a buffer store 12. In the absence of a fault, picture code elements entering the buffer store on line 10 are stepped along the buffer store locations 14a, 14b, etc., by the clock pulses at the shift input. In the presence of a fault, the input clock pulses are diverted to a length-of-fault counter 28. When the first non-defective element is sensed, the fault signal disappears and the shift pulses are again applied to the buffer store. When this happens, the count in the counter 28 is transferred to the lower portion of the first location of the buffer store and the shift pulses again move the picture code elements, with the length-of-fault entry, along the buffer store.

When the length-of-fault entry reaches the other end of the buffer store, the corresponding signal is applied to a circuit 30 which also receives the output of a counter 32. If the two signals are unequal, the output of circuit 30 causes a change-over switch 26 (which normally conveys picture code signals from location 14x of the buffer store 12 over line 24 to an output line 34) to move to a position in which it conveys to the output line a signal derived from circuit 36 and line 38 and representing the mean of the last four signals in the shift register, i.e., locations 14 ($x-1$), 14$x$, 14 ($x+1$) and 14 ($x+2$). At the same time, a change-over switch 20 (which normally applies buffer output shift pulses over line 22 to the store 12) is moved to a position in which these pulses are instead applied to the length-of-fault counter 32. Thus, circuit 30 continues to provide a fault-indicating output until the number of output shift pulses received during the fault is equal to the length-of-fault entry at the output end of the buffer store 12. When equality is reached, the change-over switches 26 and 20 revert to their original positions, the output clock pulses reset the length-of-fault counter and again act as shift pulses for the store output, and the picture code elements from location 14x are again applied to output line 34. In practice the change-over switches are electronic switching devices. An overflow connection 40 inhibits fault suppression if the faulty area extends over too many picture elements for the capacity of the counters and buffer store.

Figure 2:
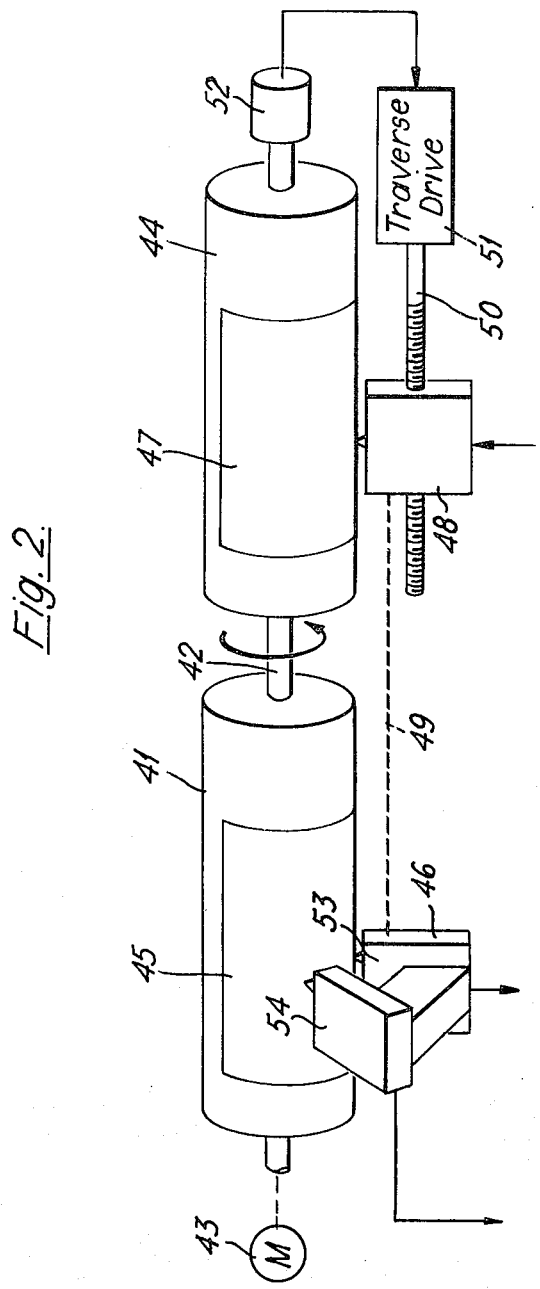
FIG. 2 shows apparatus in which the replacement signal generator of FIG. 1 can be used.

In FIG. 2, there is shown a scanning arrangement employing an analysing scanner having first and second scanning heads. In FIG. 2, an analysing cylinder 41 is monted on a shaft 42 driven by a motor 43 and a reproducing cylinder 44 is mounted on the same shaft. An original 45, with the defects marked as described above, is mounted on the cylinder 44 and is scanned by an analysing head 46. A light-sensitive sheet 47 is mounted around the reproducing cylinder 44 and is scanned by a reproducing head 48. The heads 46 and 48 are linked by a coupling 49 and are moved in a direction parallel with the shaft 42 by the rotation of a lead screw 50, driven by a traverse drive 51 under the control of a transducer 52 mounted on the shaft 42.

The analysing head 46 comprises a first portion 53 which scans the original 45 in synchronism with the scanning of the light-sensitive sheet 47 by the reproducing head 48, and a second portion 54 which scans the original 45 in advance of the first portion 53. The portion 54 provides the fault-indicating signals, which pass through a threshold circuit and a shift register, acting as a delay before being used to control the derivation of the replacement signals, for example by the apparatus shown in FIG. 1.

If the paint or ink which is used is not substantially invisible to the principal scanning head, a problem will arise. Owing to the finite size of the scanning aperture of the defect-sensing head, the output signal from the head does not show a sharp change at the instant that an area of defect-marking paint enters the field of the scanning aperture. It may be necessary for the defect-sensing head to move until two-thirds of its aperture is receiving light from the defect-marking paint before the signal from the head reaches the threshold of reliable detection of the paint. However, the signal from the principal scanning head is affected by the presence of visible paint even though this may occupy only a small part of the scanning aperture. If the defect scanning aperture and the principal scanning aperture were of the same size, there would be a region all round each paint mark where the original signal had been reproduced (i.e., no "defect" signal had been generated) but in which the picture signal is spoiled by the effect of the visible paint within the field of view of the principal scanning head.

To avoid this disadvantage, when the defect-marking paint is visible to the principal scanning head the area embraced by the "defect" signal may be extended so as to include the fringe which would otherwise be visible as an outline around each corrected area. In other words, we provide replacement signals not only for the signals corresponding to defective picture elements but also for the signals immediately adjoining the defective picture elements. This ensures that the signal from the defect-sensing head reaches the defect detection threshold level before the principal scanning head beings to "see" the edge of the area of the defect-marking paint.

Thus, in FIG. 1 the "fault signal" length can be effectively extended by modifying the input of the length-of-fault counter 28 so that on its first input pulse it jumped from a count of zero to a count of three (instead of to a count of one), thereby augmenting the total fault count by two. The buffer store would then be modified so that the fault would be regarding as originating one element earlier than it in fact originated.

Extension in a direction perpendicular to the scanning lines can be carried out by providing additional storage to accommodate signals relating to the lines preceding and following the line in which the defect is detected. The defect-detecting head may be placed one scanning line in advance of the main scanning head. Alternatively, a three-element scanning head may be used to provide the density values corresponding to the three adjacent lines of the original.

Variations of this system of varying complexity may be designed to provide more or less perfect assimilation of the fault area into the adjoining backgrounds. For example in a simpler system the picture signals for the defective area are replaced by repeats of the value of the preceding good picture element. This avoids the need for the buffer store and averaging circuit shown in FIG. 1. In a more advanced system the defective picture elements may be replaced by elements interpolated linearly between the preceding and succeeding good picture elements. This simulates the background gradient in the scanning line correction and is more effective in eliminating large faults. In a yet more complex system data storage is provided for several adjacent scanning lines, and the averaging circuit acts on picture elements adjoining the faulty area in two dimensions. Whilst the circuit in FIG. 1 relates to a single picture signal, it will be appreciated that the fault correcting principle is applicable equally well to each of the colour component signals derived from a conventional colour scanner. In general a single retouching mark is sufficient to correct all the colourcomponent signals. In addition, the output signal on line 34, instead of exposing a light source in a conventional reproducing head, may be used to control an engraving tool, for example, or any other device for treating an output image-receiving surface.

Figure 3:
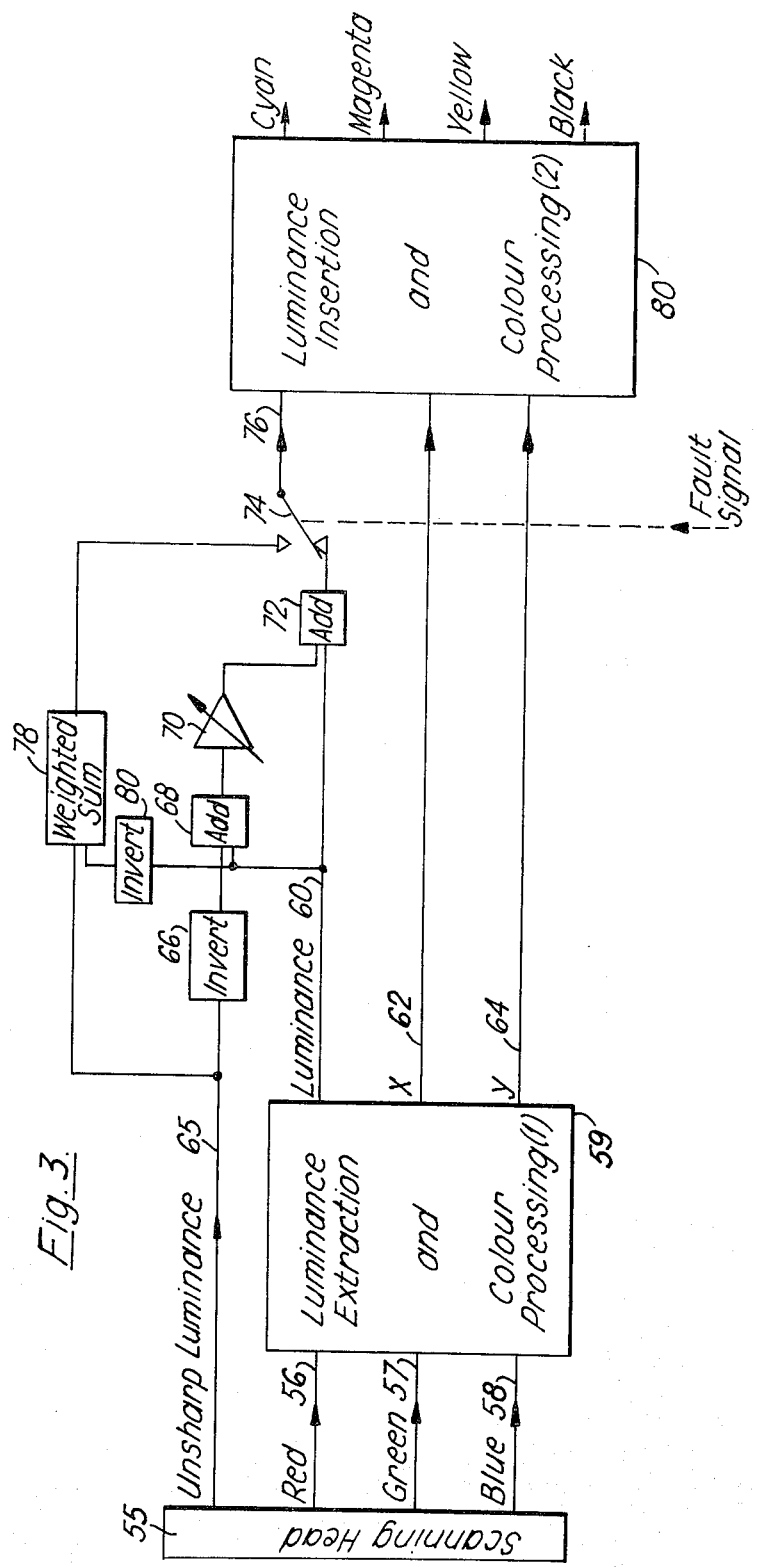
FIG. 3 shows an alternative form of apparatus for carrying out a method embodying the invention.

An alternative system for carrying the method of the invention into effect is illustrated in FIG. 3. The apparatus shown in FIG. 3 operates with analogue signals and handles chrominance and luminance signals separately. A conventional scanning head 55 scans a coloured original and generates red, green and blue signals on lines 56, 57 and 58. These signals are applied to a matrix 59 of the kind used in colour television sets to generate a luminance signal on output line 60 and two chrominance signals on lines 62 and 64. These two chrominance signals may represent, for example, the difference of the red channel signal and the luminance signal and the difference between the blue channel signal and the luminance signal, respectively. It is well known that given the three signals on lines 60, 62 and 64, the three filter signals, or the three subtractive signals for the cyan, magenta and yellow printers, can be regenerated.

In the example shown, the scanning head 55 also includes an unsharp scanner. An unsharp scanner has a larger aperture than the sharp scanners used for the colour component channels and is utilised for the purpose of detail enhancement. As is well known in image reproduction, this detail enhancement is achieved by a process of inverting the unsharp signal and combining it with the sharp signals, the effect of this being that a signal level transition, for example from light to dark, is modified so that in the reproduction the element before the transition becomes lighter and the element following the transition becomes darker, with a contrast of greater slope at the transition itself. This enhances the detail at an edge. Contrary to this normal practice, in the arrangement illustrated in FIG. 2, the unsharp scanner is used as an averaging device for the area scanned instead of as a detail enhancer, although the latter function is still present and is effected in FIG. 2 by the inverter circuit 66, the adding circuit 68 which combines the sharp luminance and unsharp luminance signals, the variable gain amplifier 70 and the adding circuit 72 which combines a portion of the sum signal from the circuit 70 with the luminance signal on line 60.

When a fault signal is present, a gate represented by switch 74 changes over so that the signal on line 76 is no longer the sharp luminance signal with detail enhanced. Instead, it is now derived from a weighted summing circuit 78 which receives at its inputs the unsharp luminance signal from line 65 and the sharp luminance signal after inversion in inverter 80. The signal obtained from circuit 78 represents only the luminance of the outer unsharp area, excluding the central area scanned by the sharp aperture. Thus the luminance content of the fault seen by the sharp scanners is replaced by the luminance content of the area surrounding the fault.

The signals on lines 76, 62 and 64 are applied to an output matrix 80 which generates a black printer signal and converts the input signals into cyan, magenta and yellow signals with undercolour removed. These signals are applied to a reproducing system to expose light-sensitive sheets to serve as the colour separations, or to treat an image receiving surface in some other way.

It is not normally necessary to modify the X and Y chrominance signals on lines 62 and 64 in response to a fault signal.

When the apparatus of FIG. 1 or the apparatus of FIG. 3 is used to carry out the invention, the density value of the defective picture element, for which a replacement signal is being calculated, is not used in the replacement signal calculation. However, where a somewhat lower standard of correction can be tolerated, it is possible to simplify the apparatus by not excluding the defective picture element or elements from the calculation of the value of the replacement signal, provided that the number of non-defective picture elements used in the calculation is sufficiently large.

I claim:
1. A method of image reproduction of the kind in which an original to be reproduced is scanned, element by element, by an analysing scanner to provide a train of electric signals representative of density values of successively scanned picture elements and in which the said train of signals is used to control the treatment of successively scanned elements of an output surface, whereby the output surface bears a reproduction of the said original, the method further comprising, for forming a retouched reproduction of the original, the steps of:

marking a defect on the original prior to scanning with the analysing scanner, the marking applied to the defect and the analysing scanner being such that signals from the scanner indicative of the defect marking are distinguishable from signals from the remainder of the original;

sensing the presence of a defect-indicating signal in the scanner output;

applying the electric signals derived from the analysing scanner to a correction generator and deriving therefrom a replacement signal for the defect-indicating signal as a function of the densities of picture elements in a strip or area within which the said defective picture element is located;

and under the control of the defect-indicating signal, substituting the said replacement signal for the electric signal corresponding to the defective picture element in the train of signals for controlling the output surface treatment.

2. A method in accordance with claim 1, in which the picture elements whose densities are used in the derivation of the replacement signal are picture elements immediately ahead of and immediately behind the defective picture element or elements in a scanned line of the original.

3. A method in accordance with claim 1, in which the picture elements whose densities are used in the derivation of the replacement signal are picture elements surrounding the defective picture element.

4. A method in accordance with claim 1, in which the picture elements whose densities are used in the derivation of the replacement signal include the said defective picture element for which the replacement signal is being derived.

5. A method in accordance with claim 1, for use in scanning reflection copy, in which the defective picture elements are marked with transparent fluorescent paint.

6. A method in accordance with claim 1, for use in the scanning of transparencies, in which defective picture elements are marked with a transparent infra-red absorbing paint.

7. A method in accordance with claim 1, in which the analysing scanner includes two scanning portions, a first scanning portion for deriving the image-representing signals and a second scanning portion, arranged to scan the original ahead of the first scanning portion, from which the defect-indicating signals are derived.

* * * * *